United States Patent
Kim et al.

(10) Patent No.: US 9,669,597 B2
(45) Date of Patent: Jun. 6, 2017

(54) GLASS FILM LAMINATE, METHOD OF MANUFACTURING THE SAME, AND METHOD OF MANUFACTURING GLASS FILM

(71) Applicant: SAMSUNG DISPLAY CO., LTD., Yongin, Gyeonggi-Do (KR)

(72) Inventors: Young-Bae Kim, Yongin (KR); Jong-Seong Kim, Yongin (KR); Jong-Hwan Lee, Yongin (KR)

(73) Assignee: Samsung Display Co., Ltd., Yongin, Gyeonggi-do (KR)

( * ) Notice: Subject to any disclaimer, the term of this patent is extended or adjusted under 35 U.S.C. 154(b) by 315 days.

(21) Appl. No.: 14/264,085

(22) Filed: Apr. 29, 2014

(65) Prior Publication Data

US 2015/0004364 A1  Jan. 1, 2015

(30) Foreign Application Priority Data

Jun. 26, 2013  (KR) ........................ 10-2013-0073537

(51) Int. Cl.
*B32B 3/00* (2006.01)
*B32B 38/00* (2006.01)
*B32B 38/10* (2006.01)
*B32B 3/30* (2006.01)
*B32B 7/06* (2006.01)
*B32B 17/06* (2006.01)

(52) U.S. Cl.
CPC .................. *B32B 3/30* (2013.01); *B32B 7/06* (2013.01); *B32B 17/06* (2013.01); *B32B 38/10* (2013.01); *B32B 2315/08* (2013.01); *Y10T 428/24355* (2015.01)

(58) Field of Classification Search
CPC .. B32B 3/30; B32B 7/06; B32B 17/06; B32B 2315/08; Y10T 428/24355
See application file for complete search history.

(56) References Cited

U.S. PATENT DOCUMENTS

| | | |
|---|---|---|
| 5,769,918 A | 6/1998 | Burt et al. |
| 8,157,945 B2 | 4/2012 | Higuchi |
| 2011/0045239 A1 | 2/2011 | Takaya et al. |
| 2011/0111194 A1 | 5/2011 | Carre et al. |
| 2012/0009703 A1 | 1/2012 | Feinstein et al. |
| 2012/0075207 A1 | 3/2012 | Jang |
| 2012/0080403 A1 | 4/2012 | Tomamoto et al. |
| 2012/0135187 A1 | 5/2012 | Takimoto et al. |
| 2012/0202010 A1 | 8/2012 | Uchida |
| 2012/0202030 A1 | 8/2012 | Kondo et al. |

FOREIGN PATENT DOCUMENTS

| | | |
|---|---|---|
| EP | 2015928 B1 | 4/2007 |
| JP | 2010-018505 A | 1/2010 |
| JP | 2010-285324 A | 12/2010 |
| JP | 2011-184284 A | 9/2011 |

*Primary Examiner* — Laura Auer
(74) *Attorney, Agent, or Firm* — Lee & Morse, P.C.

(57) ABSTRACT

A glass film laminate includes a carrier glass including a rough surface, a smooth surface surrounding the rough surface, the rough surface having a relatively large surface roughness and the smooth surface having a relatively small surface roughness, and a passage rough surface connected to the rough surface; and a glass film laminated on the rough surface and the smooth surface of the carrier glass.

16 Claims, 10 Drawing Sheets

GLASS FILM LAMINATE, METHOD OF MANUFACTURING THE SAME, AND METHOD OF MANUFACTURING GLASS FILM

CROSS-REFERENCE TO RELATED APPLICATION

Korean Patent Application No. 10-2013-0073537, filed on Jun. 26, 2013, in the Korean Intellectual Property Office, and entitled: "Glass Film Laminate, Method of Manufacturing the Same, and Method of Manufacturing Glass Film," is incorporated by reference herein in its entirety.

BACKGROUND

1. Field

Embodiments relate to a glass film laminate, a method of manufacturing the glass film laminate, and a method of manufacturing a glass film. More particularly, embodiments relate to a glass film laminate including a glass film and a carrier glass supporting the glass film. The glass film is used for electronic device such as a thin film display apparatus. Embodiments also relate to a method of manufacturing the glass film laminate, and a method of manufacturing the glass film.

2. Description of the Related Art

Generally a liquid crystal display (LCD) apparatus has various advantageous characteristics such as thin thickness, lightweight, low power consumption, etc. Thus, the LCD apparatus has been widely used in monitors, a notebook or personal computers, cellular phones, etc. The LCD apparatus includes an LCD panel displaying an image by using an optical transmissivity of liquid crystal and a backlight assembly disposed under the LCD panel to provide light to the LCD panel.

SUMMARY

Embodiments are directed to a glass film laminate including a carrier glass including a rough surface, a smooth surface surrounding the rough surface, the rough surface having a relatively large surface roughness and the smooth surface having a relatively small surface roughness, and a passage rough surface connected to the rough surface, and a glass film laminated on the rough surface and the smooth surface of the carrier glass.

The passage rough surface may extend from the rough surface to a boundary of the carrier glass.

A surface roughness of the passage rough surface may be substantially equal to as the surface roughness of rough surface.

The glass film may be smaller than the carrier glass and larger than the rough surface, in a plan view.

A boundary of the rough surface may have a shape that is substantially a same shape as a boundary of the glass film.

The rough surface and the passage rough surface may have a plurality of peaks and recesses. A height of the peaks may be less than or equal to a height of the smooth surface.

The surface roughness (Ra) of the smooth surface may be less than about 0.2 nm.

The surface roughness (Ra) of the rough surface and the passage rough surface may be greater than the surface roughness (Ra) of the smooth surface by about 0.3 nm.

A plurality of the passage rough surfaces may be connected to the rough surface.

A width of the passage rough surface may be gradually decreased from the rough surface to a boundary of the carrier glass.

Embodiments are also directed to a glass film laminate including a carrier glass, a rough surface layer on the carrier glass, and a passage rough surface layer on the carrier glass, the passage rough surface layer being connected to the rough surface layer. The rough surface layer and the passage rough surface layer have a relatively large surface roughness. An upper surface of the carrier glass on which neither the rough surface layer nor the passage rough surface layer are located is a smooth surface having a relatively small surface roughness. The passage rough surface layer extends from the rough surface layer to a boundary of the carrier glass.

A glass film may be on the carrier glass. The rough surface layer may be inside of a boundary of the glass film, in a plan view.

The rough surface layer may have a thickness greater than about 0.3 nm.

Embodiments are also directed to a method of manufacturing a glass film laminate including forming a rough surface on a carrier glass, a passage rough surface connected to the rough surface, and a smooth surface surrounding the rough surface, the rough surface having a relatively large surface roughness, the smooth surface having a relatively small surface roughness, and laminating a glass film on the carrier glass on which the rough surface, the passage rough surface, and the smooth surface are formed.

In forming the rough surface, the passage rough surface, and the smooth surface, the rough surface and the passage rough surface having the relatively large surface roughness may be formed by partially etching an upper surface of the carrier glass, and a remaining portion of the upper surface that is not etched may constitute the smooth surface.

The passage rough surface may extend from the rough surface to a boundary of the carrier glass.

The rough surface and the passage rough surface may be formed by wet-etching using a hydrofluoric acid The glass film may be smaller than the carrier glass and larger than the rough surface, in a plan view.

Forming the rough surface, the passage rough surface, and the smooth surface may include forming a rough surface layer and a passage rough surface layer to form the rough surface, the passage rough surface.

Embodiments are also directed to a method of manufacturing a glass film including forming a rough surface on a carrier glass, a passage rough surface connected to the rough surface, and a smooth surface surrounding the rough surface, the rough surface having a relatively large surface roughness, and the smooth surface having a relatively small surface roughness, forming a glass film laminate by laminating a glass film on the carrier glass on which the rough surface, the passage rough surface, and the smooth surface are formed, processing the glass film laminate in a high temperature and low vacuum process, and de-laminating the glass film from the glass film laminate.

BRIEF DESCRIPTION OF THE DRAWINGS

Features will become apparent to those of skill in the art by describing in detail exemplary embodiments with reference to the attached drawings in which.

DETAILED DESCRIPTION

Figure 1:
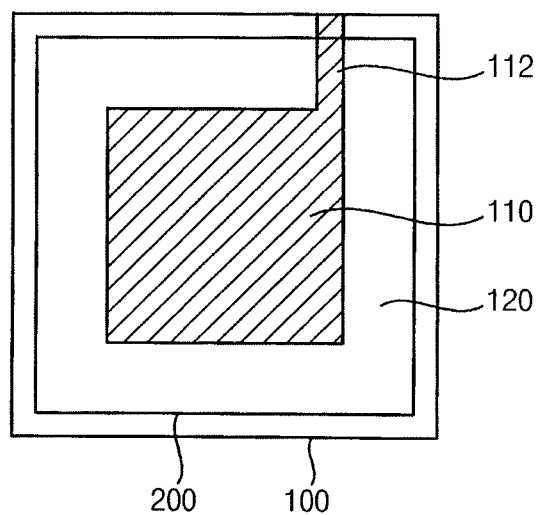
FIG. 1 illustrates a plan view of a glass film laminate according to an exemplary embodiment.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, the dimensions of layers and regions may be exaggerated for clarity of illustration. It will also be understood that when a layer or element is referred to as being "on" another layer or substrate, it can be directly on the other layer or substrate, or intervening layers may also be present. Further, it will be understood that when a layer is referred to as being "under" another layer, it can be directly under, and one or more intervening layers may also be present. In addition, it will also be understood that when a layer is referred to as being "between" two layers, it can be the only layer between the two layers, or one or more intervening layers may also be present. Like reference numerals refer to like elements throughout.

Figure 2:
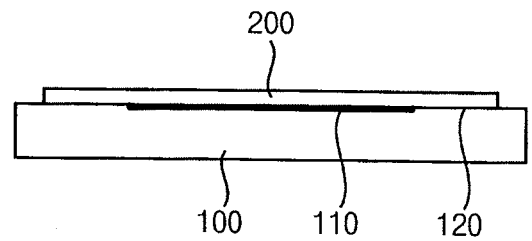
FIG. 2 illustrates a side cross-sectional view of the glass film laminate illustrated in FIG. 1.

FIG. 1 illustrates a plan view of a glass film laminate according to an exemplary embodiment. FIG. 2 illustrates a side cross-sectional view of the glass film laminate illustrated in FIG. 1.

Referring to FIGS. 1 and 2, a glass film laminate includes a carrier glass 100, and a glass film 200 disposed on and supported by the carrier glass 100.

The carrier glass 100 may include a silicate glass, a silica glass, a borosilicate glass, or an alkali-free glass. For example, an amount of alkali metal oxide in the carrier glass 100 may be less than 1,000 ppm. The carrier glass 100 may have sufficient thickness to support the glass film 200. In addition, the carrier glass 100 may be formed of a material having a small difference between a coefficient of thermal expansion at a high temperature and a coefficient of thermal expansion at a low temperature. Thus, the carrier glass 100 may stably support the glass film 200 through a high temperature process due to small deformation by heat. The carrier glass 100 may be formed by an overflow downdraw method.

An upper surface of the carrier glass 100 includes a rough surface 110 and a smooth surface 120 surrounding the rough surface 110. The rough surface 110 may be formed at a central portion of the upper surface, and may have a quadrilateral shape. The smooth surface 120 may surround the rough surface 110 at an edge of the upper surface. The upper surface of the carrier glass 100 may make contact with the glass film 200. Thus, the rough surface 110 and the smooth surface 120 may make contact with the glass film 200.

The smooth surface 120 has a surface roughness smaller than that of the rough surface 110. A portion of the carrier glass 100 where the smooth surface 120 contacts the glass film 200 may have has a relatively large adhesive area per unit area. The carrier glass 100 and the glass film 200 may be bonded each other by contacting each other, so that the glass film 200 may be firmly fixed on the carrier glass 100. For example, the surface roughness (Ra) of the smooth surface 120 may be less than about 0.2 nm.

The rough surface 110 may have a surface roughness greater than that of the smooth surface 120. Thus, a portion of the carrier glass 100 where the rough surface 110 contacts to the glass film 200 may have a relatively small adhesive area per unit area. The carrier glass 100 and the glass film 200 may not be easily bonded to each other by contacting each other. After a process has been carried out on the glass film, the glass film 200 may be easily de-laminated from the carrier glass 100. For example, the surface roughness (Ra) of the rough surface 110 may be greater than the surface roughness of the smooth surface 120 by about 0.3 nm.

The glass film 200 is disposed on the carrier glass 100. The glass film 200 may include a silicate glass, a silica glass, a borosilicate glass, or an alkali-free glass. For example, an amount of alkali metal oxide in the glass film 200 may be less than 1,000 ppm. Thus, the glass film 200 may include a same material as the carrier glass 100.

A passage rough surface 112 connected to the rough surface 110 may be formed on the upper surface of the carrier glass 100. The passage rough surface 112 may extend from the rough surface 110 to a boundary of the carrier glass 100, for example, to an outer boundary or peripheral boundary at an edge of the carrier glass 100. The passage rough surface 112 may have a surface roughness that is the same as the rough surface 110.

In a plan view, a boundary shape of the carrier glass 100, a boundary shape of the glass film 200, and a boundary shape of the rough surface 110 may be substantially the same as each other. For example, the boundary shape of the carrier glass 100 may be a quadrangle, the boundary shape of the glass film 200 may be a quadrangle smaller than the boundary shape of the carrier glass 100, and the boundary shape of the rough surface 110 may be a quadrangle smaller than the boundary shape of the glass film 200. Thus, in a plan view, the passage rough surface 112 may extend from the boundary of the rough surface 110, pass across the boundary of the glass film 200, and extends to the boundary of the carrier glass 100.

Although air between the glass film 200 and the carrier glass 100 may expand during high temperature heat treatment process, the air may be discharged through a fine space between the passage rough surface 112 and the glass film 200 such that deformation of the glass film 200 may be minimized or prevented.

Figure 3:
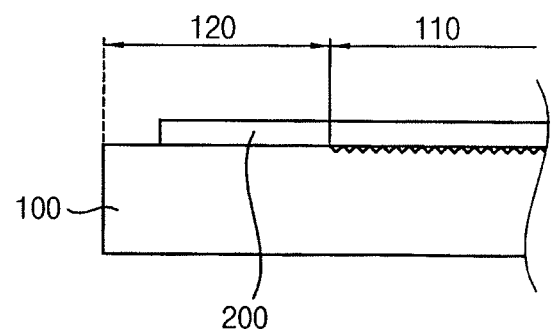
FIG. 3 illustrates a cross-sectional view of a rough surface and a smooth surface of a carrier glass of the glass film laminate illustrated in FIG. 1.
Figure 4:
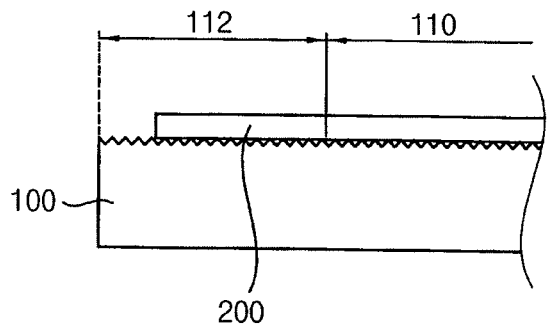
FIG. 4 illustrates a cross-sectional view of a passage rough surface of the carrier glass of the glass film laminate illustrated in FIG. 1.

FIG. 3 illustrates a cross-sectional view of a rough surface and a smooth surface of a carrier glass of the glass film laminate illustrated in FIG. 1. FIG. 4 illustrates a cross-sectional view of a passage rough surface of the carrier glass of the glass film laminate illustrated in FIG. 1.

Referring to FIGS. 1, 3, and 4, an upper surface of the carrier glass 100 may include a rough surface 110 and a smooth surface 120 surrounding the rough surface 110. The upper surface of the carrier glass 100 may made contact with the glass film 200. The rough surface 110 and the smooth surface 120 make contact with the glass film 200.

The smooth surface 120 may have a surface roughness smaller than that of the rough surface 110. A portion of the carrier glass 100 where the smooth surface 120 contacts the glass film 200 may have a relatively large adhesive area per unit area. The carrier glass 100 and the glass film 200 may be bonded each other by contacting each other, so that the glass film 200 may be firmly fixed on the carrier glass 100.

The rough surface 110 may have a surface roughness greater than that of the smooth surface 120. A portion of the carrier glass 100 where the rough surface 110 contacts the glass film 200 may have a relatively small adhesive area per unit area. The carrier glass 100 and the glass film 200 may not be easily bonded to each other by contact in the portion where the rough surface 110 is present. After a process has been carried out on the glass film, the glass film 200 may be easily de-laminated from the carrier glass 100.

The rough surface 110 having a relatively large surface roughness may be formed by partially removing the upper surface of the carrier glass 100. A remaining portion of the upper surface of the carrier glass 100 may be the smooth surface 120. Thus, recesses in the rough surface 110 may have a height that is less than the height of the smooth surface 120, and peaks in the rough surface 110 may have a height that is less than or the same as the height of the smooth surface 120.

The passage rough surface 112 may extend from the rough surface 110 to a boundary of the carrier glass 100, for example, to an outer or peripheral boundary at an edge of the carrier glass 100. The passage rough surface 112 may have a surface roughness that is the same as that of the rough surface 110. As an example, so that the passage rough surface 112 having relatively large surface roughness may be formed by partially removing the upper surface of the carrier glass 100.

The carrier glass 100 and the glass film 200 may be bonded to each other by contacting each other, so that the glass film 200 may be firmly fixed on the carrier glass 100. The rough surface 110 and the passage rough surface 112 may not bond to the glass film 200. A space may be formed between the rough surface 110 and the glass film 200, and between the passage rough surface 112 and the glass film 200 due to the surface roughness of the rough surface 110 and the surface roughness of the passage rough surface 112. If air between the glass film 200 and the carrier glass 100 expands during a high temperature heat treatment process, the air may be discharged through a fine space between the passage rough surface 112 and the glass film 200 such that deformation of the glass film 200 may be minimized or prevented.

FIGS. 5A to 5D illustrate plan views of various modifications of a passage rough surface.

Figure 5A:
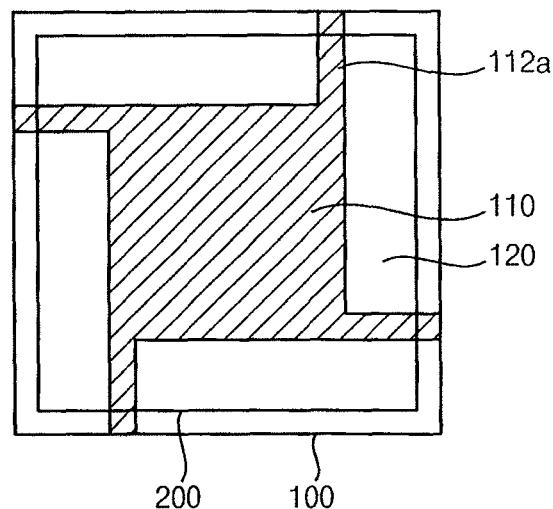
FIGS. 5A to 5D illustrate plan views of various modifications of a passage rough surface.

Referring to FIG. 5A, a glass film may include includes a carrier glass 100 and a glass film 200 disposed on and supported by the carrier glass 100. An upper surface of the carrier glass 100 may include a rough surface 110 and a smooth surface 120 surrounding the rough surface 110. The rough surface 110 may have a quadrilateral shape. A passage rough surface 112a may extend from the rough surface 110 to a boundary of the carrier glass 100. The passage rough surface 112a may extend from each of edges of the rough surface 110 having the quadrilateral shape perpendicular to each of sides of the quadrilateral shape. Four of the passage rough surfaces 112a may be formed at four edges of the quadrilateral shape.

The glass film laminate may be substantially same as a glass film laminate in FIGS. 1 to 4, except for a shape of the passage rough surface 112a.

Figure 5B:
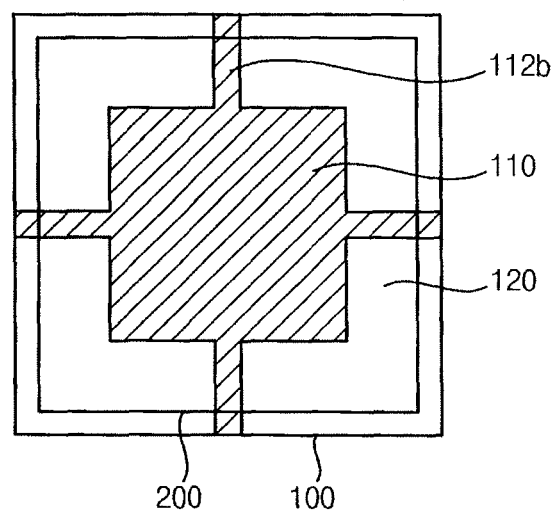

Referring to FIG. 5B, a glass film laminate may include a carrier glass 100 and a glass film 200 disposed on and supported by the carrier glass 100. An upper surface of the carrier glass 100 may include a rough surface 110 and a smooth surface 120 surrounding the rough surface 110. The rough surface 110 may have a quadrilateral shape. A passage rough surface 112b may extend from the rough surface 110 to a boundary of the carrier glass 100. The passage rough surface 112b may extend from a center of each of the sides of the rough surface 110 having the quadrilateral shape perpendicular to each of sides of the quadrilateral shape. Four of the passage rough surfaces 112b may be formed the four sides of the quadrilateral shape.

The glass film laminate may be substantially same as a glass film laminate in FIGS. 1 to 4, except for a shape of the passage rough surface 112b.

Figure 5C:
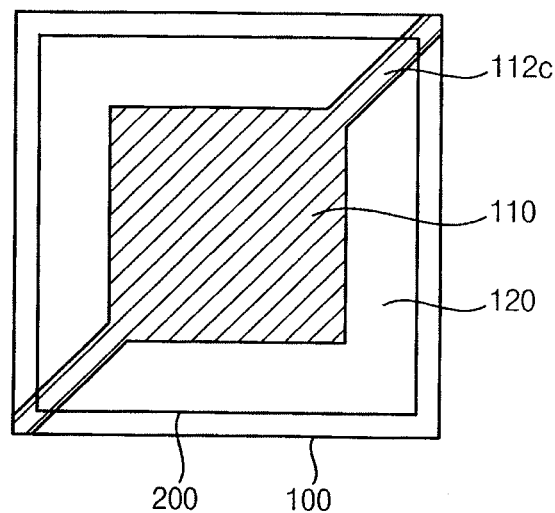

Referring to FIG. 5C, a glass film laminate may include a carrier glass 100 and a glass film 200 disposed on and supported by the carrier glass 100. An upper surface of the carrier glass 100 may include a rough surface 110 and a smooth surface 120 surrounding the rough surface 110. The rough surface 110 may have a quadrilateral shape. A passage rough surface 112c may extend from the rough surface 110 to a boundary of the carrier glass 100. The passage rough surface 112c may extend from each of edges of the rough surface 110 having the quadrilateral shape to each of edges of the carrier glass 100. Two of the passage rough surface 112c may be formed at two edges of the quadrilateral shape that faces each other. For example, the passage rough surface 112c may extend from one or more corners of the rough surface 110 to a respective corner of the carrier glass 100.

The glass film laminate may be substantially same as a glass film laminate in FIGS. 1 to 4, except for a shape of the passage rough surface 112c.

Figure 5D:
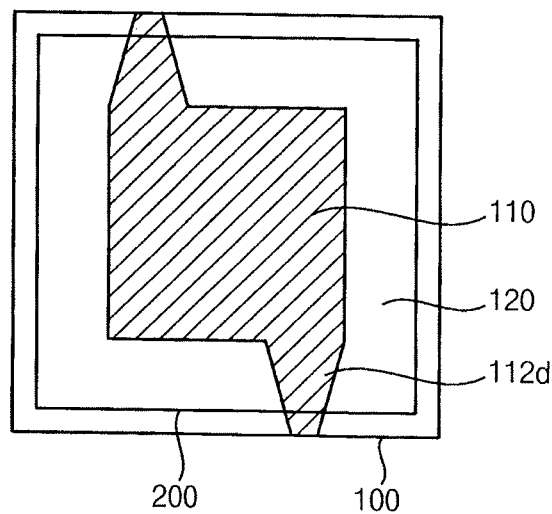

Referring to FIG. 5D, a glass film laminate may include a carrier glass 100 and a glass film 200 disposed on and supported by the carrier glass 100. An upper surface of the carrier glass 100 may include a rough surface 110 and a smooth surface 120 surrounding the rough surface 110. The rough surface 110 may have a quadrilateral shape. A passage rough surface 112d may extend from the rough surface 110 to a boundary of the carrier glass 100. The passage rough surface 112d may extend from edges of the rough surface 110 having the quadrilateral shape perpendicular to sides of the quadrilateral shape. A width of the passage rough surface 112d may gradually decrease from the rough surface 110 to the boundary of the carrier glass 100. Two of the passage rough surfaces 112d may be formed at two edges of the quadrilateral shape that face each other.

In the present example embodiment, the passage rough surface 112d may have a larger width near the rough surface 110. Accordingly, air between the rough surface 110 and the glass film 200 may be efficiently discharged.

The glass film laminate may be substantially same as a glass film laminate in FIGS. 1 to 4, except for a shape of the passage rough surface 112d.

In other implementations, the passage rough surface may have various shapes to discharge the air between the rough surface 110 and the glass film 200.

Figure 6:
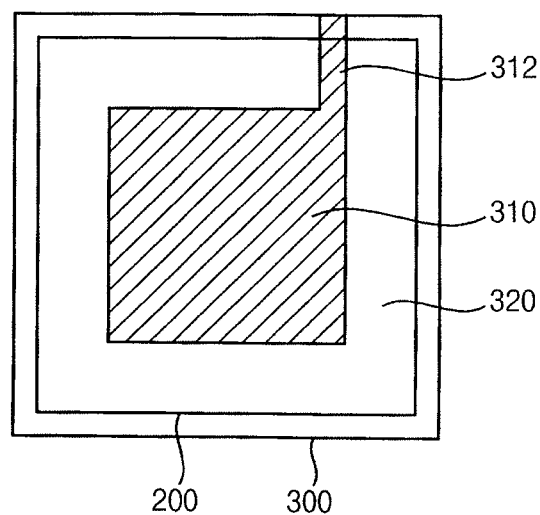
FIG. 6 illustrates a plan view of a glass film laminate according to another an exemplary embodiment.
Figure 7:
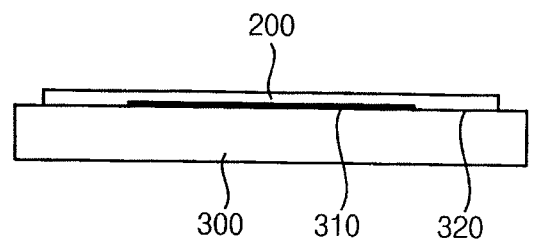
FIG. 7 illustrates a side cross-sectional view of the glass film laminate illustrated in FIG. 6.

FIG. 6 illustrates a plan view of a glass film laminate according to another exemplary embodiment. FIG. 7 illustrates a side cross-sectional view of the glass film laminate illustrated in FIG. 6.

Referring to FIGS. 6 and 7, the glass film laminate includes a carrier glass 300, a rough surface layer 310 on the carrier glass 300, and a glass film 200 on the carrier glass 300 on which the rough surface layer 310 is formed.

The carrier glass 300 may include a silicate glass, a silica glass, a borosilicate glass, or an alkali-free glass. For example, an amount of alkali metal oxide in the carrier glass 300 may be less than 1000 ppm. The carrier glass 300 may have sufficient thickness to support the glass film 200. The carrier glass 300 may be formed of a material having a small difference between a coefficient of thermal expansion at a high temperature and a thermal coefficient of thermal expansion at a low temperature. Thus, the carrier glass 300 may stably support the glass film 200 through a high temperature process due to small deformation by heat. The carrier glass 300 may be formed by an overflow downdraw method.

An upper surface of the carrier glass 300 may have a relatively small surface roughness. Thus, in a remaining portion of the upper surface of the carrier glass 300, where the rough surface 310 is not formed, the carrier glass 300 may have a smooth surface 320.

The smooth surface 320 may have a surface roughness smaller than the rough surface layer 310. A portion of the carrier glass 300 where the smooth surface 320 contacts to the glass film 200 may have a relatively large adhesive area per unit area. The carrier glass 300 and the glass film 200 may be bonded each other by contacting each other, so that the glass film 200 may be firmly fixed on the carrier glass 300. For example, the surface roughness (Ra) of the smooth surface 320 may be less than about 0.2 nm.

The rough surface layer 310 is formed on the carrier glass 300. The rough surface layer 310 may have thin film shape, and may have a thickness of more than about 0.3 nm.

The rough surface layer 310 may have a surface roughness greater than that of the smooth surface 320. A portion of the carrier glass 300 where the rough surface layer 310 contacts to the glass film 200 may have a relatively small adhesive area per unit area such that the carrier glass 300 and the glass film 200 may not be easily bonded to each other by contacting each other. After a process has been carried out on the glass film, the glass film 200 may be easily de-laminated from the carrier glass 300. For example, the surface roughness (Ra) of the rough surface layer 310 may be greater than the surface roughness of the smooth surface 320 by about 0.3 nm.

The glass film 200 may be disposed on the carrier glass 300. The glass film 200 may include a silicate glass, a silica glass, a borosilicate glass, or an alkali-free glass. For example, the amount of alkali metal oxide in the glass film 200 may be less than 1,000 ppm. Thus, the glass film 200 may include a material same as the carrier glass 300.

A passage rough surface layer 312 connected to the rough surface layer 310 may be formed on the upper surface of the carrier glass 300, for example, to an outer boundary or peripheral boundary at an edge of the carrier glass 100. The passage rough surface layer 312 may extend from the rough surface layer 310 to a boundary of the carrier glass 300. The passage rough surface layer 312 may be formed from a same layer as the rough surface layer 310. The passage rough surface layer 312 may have a surface roughness that is the same as the surface roughness of the rough surface layer 310.

In a plan view, a boundary shape of the carrier glass 300, a boundary shape of the glass film 200, and a boundary shape of the rough surface layer 310 may be substantially the same. For example, the boundary shape of the carrier glass 300 may be a quadrangle, the boundary shape of the glass film 200 may be a quadrangle smaller than the boundary shape of the carrier glass 300, and the boundary shape of the rough surface layer 310 may be a quadrangle smaller than the boundary shape of the glass film 200. In a plan view, the passage rough surface layer 312 may extend from the boundary of the rough surface layer 310, pass through the boundary of the glass film 200, and extend to the boundary of the carrier glass 300.

Accordingly, if air between the glass film 200 and the carrier glass 300 expands during a high temperature heat treatment process, the air may be discharged through a fine space between the passage rough surface layer 312 and the glass film 200 such that deformation of the glass film 200 may be minimized or prevented.

Figure 8:
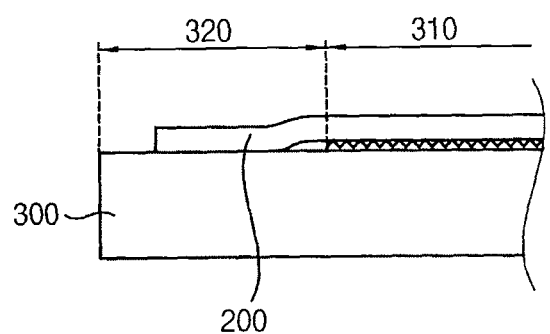
FIG. 8 illustrates a cross-sectional view of a rough surface and a smooth surface of a carrier glass of the glass film laminate illustrated in FIG. 6.
Figure 9:
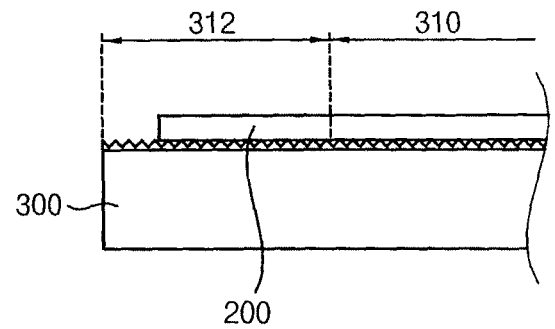
FIG. 9 illustrates a cross-sectional view of a passage rough surface of the carrier glass of the glass film laminate illustrated in FIG. 6.

FIG. 8 illustrates a cross-sectional view of a rough surface and a smooth surface of a carrier glass of the glass film laminate illustrated in FIG. 6. FIG. 9 illustrates a cross-sectional view of a passage rough surface of the carrier glass of the glass film laminate illustrated in FIG. 6.

Referring to FIGS. 6, 8 and 9, an upper surface of the carrier glass 300 may have a relatively small surface roughness. The rough surface layer 310 may be formed on the carrier glass 300. Thus, the smooth surface 320 may be present on the upper surface of the carrier glass 300, except for where the rough surface layer 310 is formed. The rough surface layer 310 may have a suitable thickness. For example, the rough surface layer 310 may have thin film shape, and may have a thickness of more than about 0.3 nm. The upper surface of the carrier glass 300 may make contact with the glass film 200. Thus, the rough surface layer 310 and the smooth surface 320 may make contact with the glass film 200. The glass film 200 may have flexibility. Although the rough surface layer 310 has a thickness, the glass film 200 may make contact with the smooth surface 320.

The smooth surface 320 may have a surface roughness smaller than that of the rough surface layer 310. A portion of the carrier glass 300 where the smooth surface 320 contacts the glass film 200 may have a relatively large adhesive area per unit area. The carrier glass 300 and the glass film 200 may be bonded each other by contacting each other, so that the glass film 200 may be firmly fixed on the carrier glass 300.

The rough surface layer 310 may have a surface roughness greater than that of the smooth surface 320. A portion of the carrier glass 300 where the rough surface layer 310 contacts the glass film 200 may have a relatively small adhesive area per unit area. The carrier glass 300 and the glass film 200 may not easily be bonded to each other by contact in the portion where the rough surface layer 310 is present. After a process has been carried out on the glass film, the glass film 200 may be easily de-laminated from the carrier glass 300.

A passage rough surface layer 312 connected to the rough surface layer 310 may be formed on the upper surface of the carrier glass 300. The passage rough surface layer 312 may extend from the rough surface layer 310 to a boundary of the carrier glass 300. The passage rough surface layer 312 may be formed from a same layer as the rough surface layer 310, for example, to an outer or peripheral boundary at an edge of the carrier glass 100. The passage rough surface layer 312 may have a surface roughness that is the same as the surface roughness of the rough surface layer 310.

The carrier glass 300 and the glass film 200 may be bonded to each other by contacting each other, so that the glass film 200 may be firmly fixed on the carrier glass 300. The rough surface layer 310 and the passage rough surface layer 312 may not be bonded to the glass film 200. A space may be formed between the rough surface layer 310 and the glass film 200, and between the passage rough surface layer 312 and the glass film 200 due to the surface roughness of the rough surface layer 310 and the passage rough surface layer 312. If air between the glass film 200 and the carrier glass 300 expands during high temperature heat treatment process, the air may be discharged through a fine space between the passage rough surface layer 312 and the glass film 200 such that deformation of the glass film 200 may be minimized or prevented.

FIGS. 10A to 10D illustrate a plan view and cross-sectional views of stages of a method of manufacturing the glass film laminate and glass film illustrated in FIG. 1.

Figure 10A:
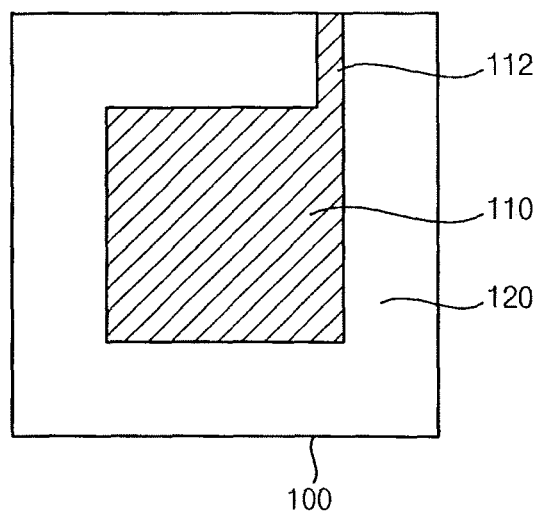
FIGS. 10A to 10D illustrate a plan view and cross-sectional views of stages a method of manufacturing the glass film laminate and a glass film as illustrated in FIG. 1.
Figure 10B:
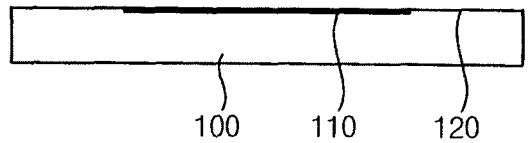

Referring to FIGS. 10A and 10B, a rough surface 110, a passage rough surface 112 and a smooth surface 120 may be formed on a carrier glass 100.

The carrier glass 100 may include a silicate glass, a silica glass, a borosilicate glass, or an alkali-free glass. The carrier glass 100 may be substantially same as a carrier glass described with respect to FIG. 1. The carrier glass 100 may be formed, for example, by an overflow downdraw method.

The rough surface 110 and the passage rough surface 112 may be formed by partially etching an upper surface of the carrier glass 100. A portion of the upper surface of the carrier glass 100 may be etched using hydrogen fluoride (HF). The rough surface 110 and the passage rough surface 112 having a surface roughness greater than that of the smooth surface 120, which is not etched, may be formed. For example, the rough surface 110 and the passage rough surface 112 may be formed by wet-etching using hydrofluoric acid. In other implementations, the rough surface 110 and the passage rough surface 112 may be formed by dry-etching using an atmospheric plasma.

A surface roughness of the rough surface 110 may be greater than that of the smooth surface 120. For example, the surface roughness (Ra) of the rough surface 110 may be greater than the surface roughness of the smooth surface 120 by about 0.3 nm.

The passage rough surface 112 may be connected to the rough surface 110, and extends to a boundary of the carrier glass 100, for example, to an outer boundary or peripheral boundary at an edge of the carrier glass 100. The passage rough surface 112 may have various configurations, such as are shown, for example, in FIGS. 5A to 5D, described above.

The smooth surface 120 is the upper surface of the carrier glass 100 that is not etched. The smooth surface 120 has a surface roughness that is smaller than that of the rough surface 110.

For example, the surface roughness (Ra) of the smooth surface 120 may be less than about 0.2 nm.

Figure 10C:
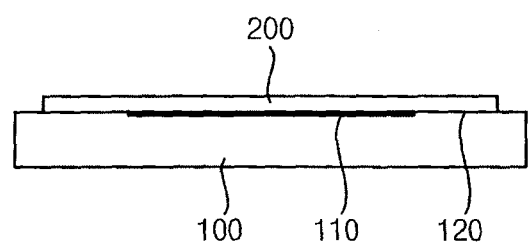

Referring to FIG. 10C, a glass film laminate may be formed by laminating a glass film 200 on the carrier glass 100 on which the rough surface 110 and the smooth surface 120 are formed.

The smooth surface 120 may have a surface roughness smaller than that of the rough surface 110. A portion of the carrier glass 100 where the smooth surface 120 contacts the glass film 200 may have a relatively large adhesive area per unit area. The carrier glass 100 and the glass film 200 may be bonded to each other by contacting each other, so that the glass film 200 may be firmly fixed on the carrier glass 100.

The glass film laminate may be subjected to a plurality of additional processes. For example, various patterns and layers may be formed on the glass film 200 of the glass film laminate in the course of manufacturing a thin film display apparatus. The glass film laminate may be subjected to a high temperature heat treatment process. During the high temperature heat treatment process, air between the glass film 200 and the carrier glass 100 may be discharged through a fine space between the passage rough surface 112 and the glass film 200. Thus, deformation of the glass film 200 may be minimized or prevented.

Figure 10D:
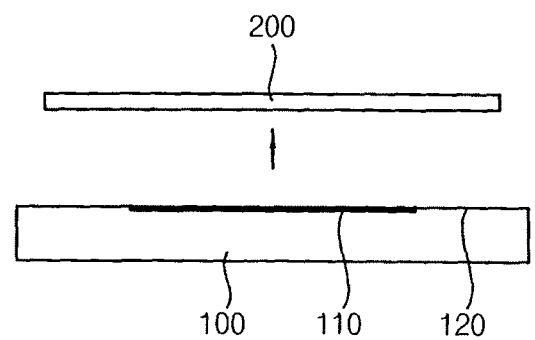

Referring to FIG. 10D, the formation of the glass film 200, which undergone various processes, is completed by delaminating the glass film 200 from the carrier glass 100.

The rough surface 110 may have a surface roughness greater than that of the smooth surface 120. A portion of the carrier glass 100 where the rough surface 110 contacts to the glass film 200 may have a relatively small adhesive area per unit area. The carrier glass 100 and the glass film 200 may not easily bond to each other by contacting each other, such that after additional processes have been carried out, the glass film 200 may be easily de-laminated from the carrier glass 100.

In addition, the carrier glass 100 may be used again for manufacturing another glass film.

FIGS. 11A to 11D illustrate a plan view and cross-sectional views of stages of a method of manufacturing the glass film laminate and a glass film illustrated in FIG. 6.

Figure 11A:
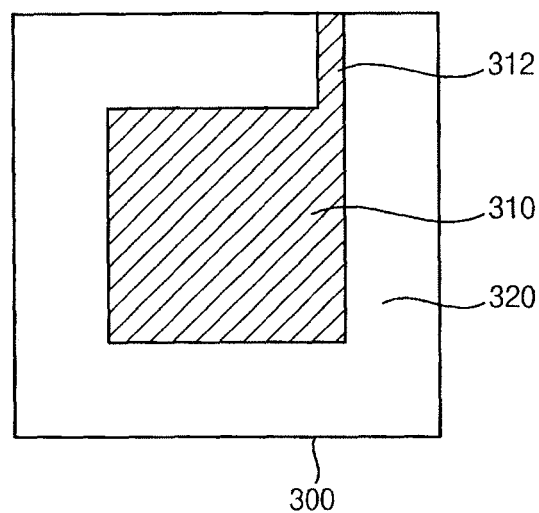
FIGS. 11A to 11D illustrate a plan view and cross-sectional views illustrating stages of a method of manufacturing the glass film laminate and a glass film as illustrated in FIG. 6.
Figure 11B:
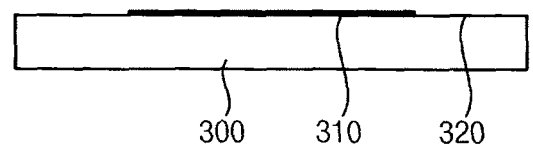

Referring to FIGS. 11A and 11B, a rough surface layer 310, a passage rough surface layer 312 and a smooth surface 320 are formed on a carrier glass 300.

The carrier glass 300 may include a silicate glass, a silica glass, a borosilicate glass, or an alkali-free glass. The carrier glass 300 may be substantially the same as a carrier glass described with respect to FIG. 1. For example, the carrier glass 300 may be formed by a overflow downdraw method.

The rough surface layer 310 and the passage rough surface layer 312 may be formed on a portion of an upper surface of the carrier glass 300. The rough surface layer 310 and the passage rough surface layer 312 may have a proper thickness. For example, the rough surface layer 310 and the passage rough surface layer 312 may have a thin film shape, and have a thickness of more than about 0.3 nm.

A surface roughness of the rough surface layer 310 and the passage rough surface layer 312 may be greater than the surface roughness of the smooth surface 120. For example, the surface roughness (Ra) of the rough surface layer 310 and the passage rough surface layer 312 may be greater than the surface roughness of the smooth surface 320 by about 0.3 nm.

The passage rough surface layer 312 may be connected to the rough surface layer 310, and may extend to a boundary of the carrier glass 300, for example, to an outer boundary or peripheral boundary at an edge of the carrier glass 100. The passage rough surface layer 312 may have various configurations, such as are shown, for example, in FIGS. 5A to 5D.

The smooth surface 320 is the upper surface of the carrier glass 100 on which the rough surface layer 310 and the passage rough surface layer 312 are not formed. The smooth surface 320 may have a surface roughness smaller than that of the rough surface layer 310. For example, the surface roughness (Ra) of the smooth surface 320 may be less than about 0.2 nm.

Figure 11C:
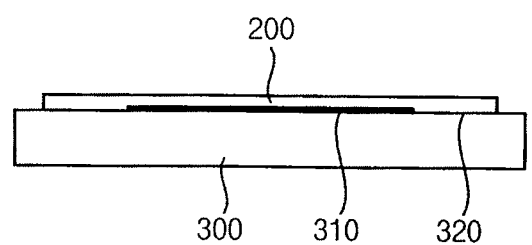

Referring to FIG. 11C, a glass film laminate may be formed by laminating a glass film 200 on the carrier glass 300 on which the rough surface layer 310 and the smooth surface 320 are formed.

The smooth surface 320 may have a surface roughness smaller than that of the rough surface layer 310. A portion of the carrier glass 300 where the smooth surface 320 contact the glass film 200 may have a relatively large adhesive area per unit area. The carrier glass 300 and the glass film 200 may be bonded each other by contacting each other, so that the glass film 200 may be firmly fixed on the carrier glass 300.

The glass film laminate may be subjected to a plurality of additional processes. For example, various patterns and layers may be formed on the glass film 200 of the glass film laminate in the course of manufacturing a thin film display apparatus. The glass film laminate may be subjected to a high temperature heat treatment process. During the high temperature heat treatment process, air between the glass film 200 and the carrier glass 300 may be discharged through a fine space between the passage rough surface layer 312 and the glass film 200 such that deformation of the glass film 200 may be minimized or prevented.

Figure 11D:
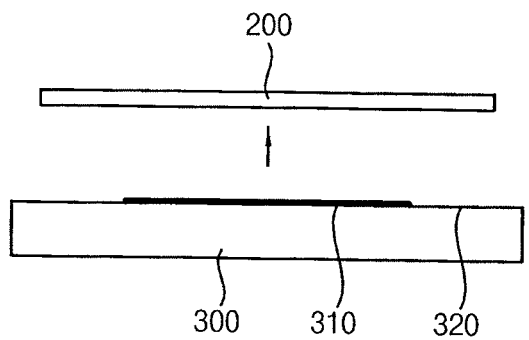

Referring to FIG. 11D, the formation of the glass film 200, which has undergone various processes, is completed by delaminating the glass film 200 from the carrier glass 100.

The rough surface layer 310 may have a surface roughness greater than that of the smooth surface 320. A portion of the carrier glass 300 where the rough surface layer 310 contacts to the glass film 200 may have a relatively small adhesive area per unit area. Thus, the carrier glass 300 and the glass film 200 may not be easily bonded to each other by contact. After a process has been carried out on the glass film, the glass film 200 may be easily de-laminated from the carrier glass 300.

By way of summation and review, as demand for a flexible display having flexibility and small thickness has increased, a display using a glass film has been developed. The glass film may be manufactured by using a glass film laminate having a glass film and a carrier glass. However, in a general glass film laminate, air between the carrier glass and the glass film may expand during high temperature and low vacuum process and may cause deformation of the glass film.

One or more exemplary embodiment of the invention provides a glass film having improved quality, which is formed through high temperate and high pressure process, and a glass film laminate including the glass film and a carrier glass supporting the glass film.

One or more exemplary embodiments of the invention also provide a method of manufacturing the glass film laminate.

One or more exemplary embodiments of the invention also provide a method of manufacturing the glass film.

According to the exemplary embodiments, a glass film laminate may include a carrier glass including a rough surface, a passage rough surface and a smooth surface. If air between the glass film and the carrier glass expands during a high temperature process, the air may be discharged through a fine space between the passage rough surface and the glass film, so that deformation of the glass film may be minimized or prevented.

In addition, the smooth surface may have a surface roughness smaller than that of the rough surface. Thus, a portion, where the smooth surface contacts to the glass film, may have a relatively large adhesive area per unit area. The carrier glass and the glass film may be bonded each other by contacting each other, so that the glass film may be firmly fixed on the carrier glass.

In addition, the rough surface may have a surface roughness greater than that of the smooth surface. A portion of the carrier glass where the rough surface contacts to the glass film may have a relatively small adhesive area per unit area. Thus, the carrier glass and the glass film may not be easily be bonded to each other by contact. After a process has been carried out on the glass film, the glass film may be easily de-laminated from the carrier glass.

In addition, the passage rough surface may have various shapes to efficiently discharge the air.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope thereof as set forth in the following claims.

What is claimed is:

1. A glass film laminate, comprising:
   a carrier glass including:
   a rough surface, the rough surface having a shape that is defined in plan view by sides that are all spaced apart from boundaries of the carrier glass;
   a smooth surface surrounding the sides of the rough surface such that the smooth surface is between the boundaries of the carrier glass and sides of the rough surface, the rough surface having a relatively large surface roughness and the smooth surface having a relatively small surface roughness; and
   a passage rough surface connected to one of the sides of the rough surface and extending between the side of the rough surface and a boundary of the carrier glass, a width of the passage rough surface where the passage rough surface connects to one of the sides of the rough surface being less than a width of the one of the sides of the rough surface; and
   a glass film laminated on the rough surface and the smooth surface of the carrier glass.

2. The glass film laminate as claimed in claim 1, wherein a surface roughness of the passage rough surface is substantially equal to a surface roughness of rough surface.

3. The glass film laminate as claimed in claim 1, wherein the glass film is smaller than the carrier glass and larger than the rough surface, in a plan view.

4. The glass film laminate as claimed in claim 3, wherein a boundary of the rough surface has a shape that is substantially a same shape as a boundary of the glass film.

5. The glass film laminate as claimed in claim 1, wherein:
   the rough surface and the passage rough surface have a plurality of peaks and recesses, and
   a height of the peaks is less than or equal to a height of the smooth surface.

6. The glass film laminate as claimed in claim 1, wherein the surface roughness (Ra) of the smooth surface is less than about 0.2 nm.

7. The glass film laminate as claimed in claim 1, wherein the surface roughness (Ra) of the rough surface and the passage rough surface is greater than the surface roughness (Ra) of the smooth surface by about 0.3 nm.

8. The glass film laminate as claimed in claim 1, wherein a plurality of the passage rough surfaces are connected to the rough surface.

9. The glass film laminate as claimed in claim 1, wherein the width of the passage rough surface is gradually decreased from the one of the sides of the rough surface to the boundary of the carrier glass.

10. A method of manufacturing a glass film laminate, the method comprising:
forming a rough surface on a carrier glass, a passage rough surface connected to the rough surface, and a smooth surface surrounding the rough surface, the rough surface having a relatively large surface roughness, and the smooth surface having a relatively small surface roughness, wherein the rough surface has a shape that is defined in plan view by sides that are all spaced apart from boundaries of the carrier glass, the smooth surface surrounds the sides of the rough surface such that the smooth surface is between the boundaries of the carrier glass and sides of the rough surface, and the passage rough surface is connected to one of the sides of the rough surface and extends between the side of the rough surface and a boundary of the carrier glass, a width of the passage rough surface where the passage rough surface connects to one of the sides of the rough surface being less than a width of the one of the sides of the rough surface; and
laminating a glass film on the carrier glass on which the rough surface, the passage rough surface, and the smooth surface are formed.

11. The method as claimed in claim 10, wherein in forming the rough surface, the passage rough surface, and the smooth surface:
the rough surface and the passage rough surface having the relatively large surface roughness are formed by partially etching an upper surface of the carrier glass, and
a remaining portion of the upper surface that is not etched constitutes the smooth surface.

12. The method as claimed in claim 11, wherein the passage rough surface extends from the rough surface to a boundary of the carrier glass.

13. The method as claimed in claim 11, wherein the rough surface and the passage rough surface are formed by wet-etching using a hydrofluoric acid.

14. The method as claimed in claim 10, wherein the glass film is smaller than the carrier glass and larger than the rough surface, in a plan view.

15. The method as claimed in claim 10, wherein forming the rough surface, the passage rough surface, and the smooth surface includes:
forming a rough surface layer and a passage rough surface layer to form the rough surface, the passage rough surface.

16. A method of manufacturing a glass film, the method comprising:
forming a rough surface on a carrier glass, a passage rough surface connected to the rough surface, and a smooth surface surrounding the rough surface, the rough surface having a relatively large surface roughness, and the smooth surface having a relatively small surface roughness, wherein the rough surface has a shape that is defined in plan view by sides that are all spaced apart from boundaries of the carrier glass, the smooth surface surrounds the sides of the rough surface such that the smooth surface is between the boundaries of the carrier glass and sides of the rough surface, and the passage rough surface is connected to one of the sides of the rough surface and extends between the side of the rough surface and a boundary of the carrier glass, a width of the passage rough surface where the passage rough surface connects to one of the sides of the rough surface being less than a width of the one of the sides of the rough surface;
forming a glass film laminate by laminating a glass film on the carrier glass on which the rough surface, the passage rough surface, and the smooth surface are formed;
processing the glass film laminate in a high temperature and low vacuum process; and
de-laminating the glass film from the glass film laminate.

* * * * *